May 5, 1959

E. W. GRANT 2,885,644

INDUCTIVE TRANSDUCER

Filed Dec. 3, 1954

INVENTOR.

EARL W. GRANT

BY Philip Subkow

ATTORNEY.

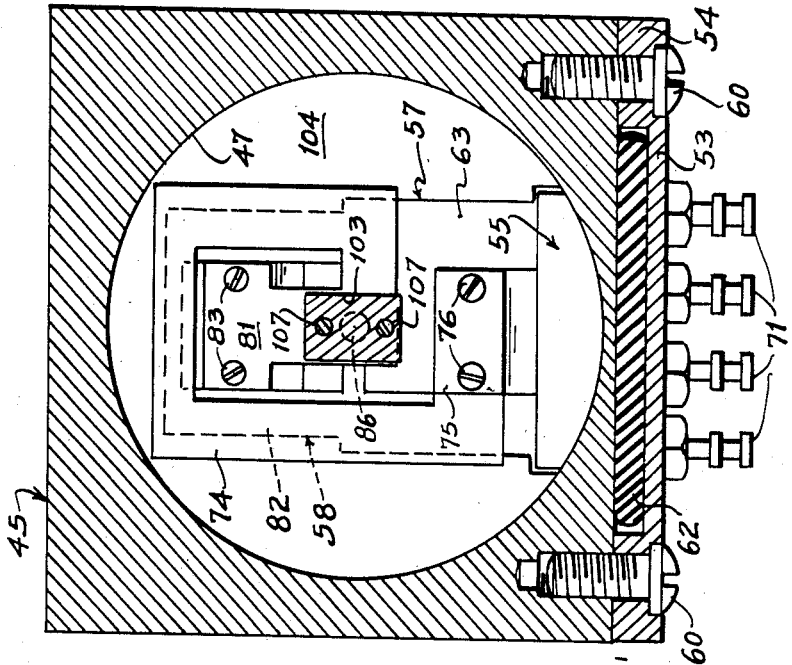
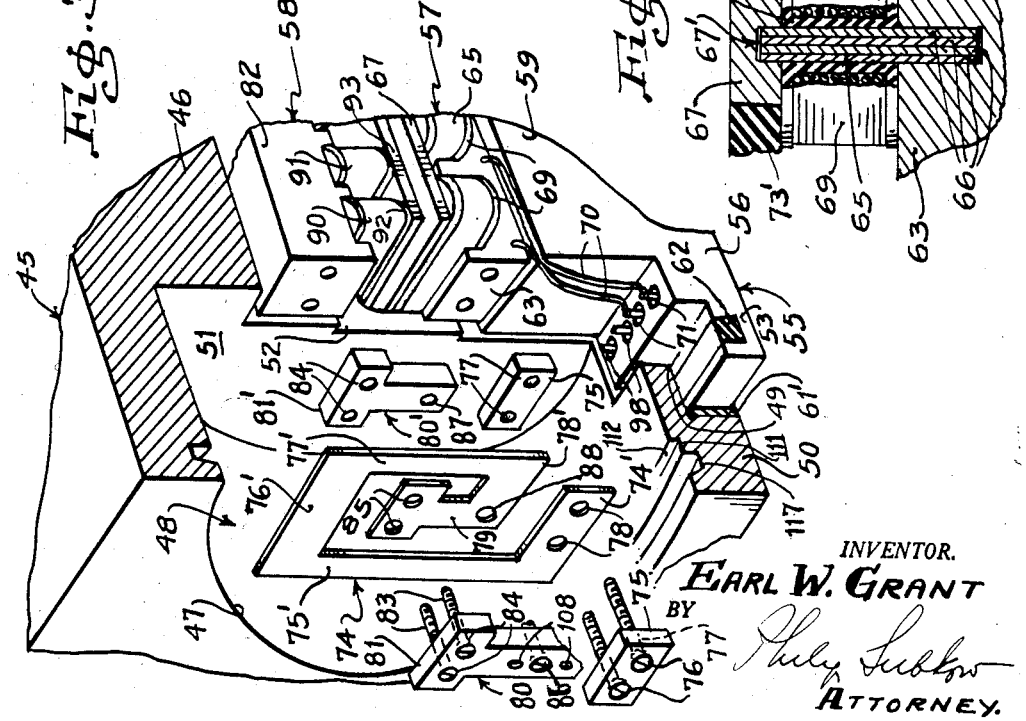

United States Patent Office 2,885,644
Patented May 5, 1959

2,885,644

INDUCTIVE TRANSDUCER

Earl W. Grant, Los Angeles, Calif., assignor to Statham Instruments, Inc., Los Angeles, Calif., a corporation of California Application December 3, 1954, Serial No. 473,013

11 Claims. (Cl. 336—119)

This invention relates to motion sensing devices such as displacement meters, velocimeters, accelerometers, pressure gages and the like, employing a transducer which operates on the inductive or transformer principle, and is particularly concerned with the provision of a novel differential area inductive transducer.

In the transducer of the invention, I employ two electrical conductor elements which are displaceable with respect to each other. One of the said conductors may be termed the primary of the transformer and the other the secondary of the transformer. In one embodiment of the invention, the secondary is placed in motion while the primary remains substantially stationary. The primary is constructed of a core having high magnetic permeability, a winding about such core and a pole face of predetermined area. Preferably, the primary has a plurality of core elements and an equal number of pole faces, the core elements having coils wound thereon in such a direction as to make alternate pole faces of opposite magnetic polarity when a voltage is applied to the coils. The coils are energized from a source of alternating current, the frequency of which may vary between wide limits. The secondary has two spaced pole faces and two series-connected coils, said pole faces operating in conjunction with each of the primary pole faces. Each primary pole face is substantially equally spaced by a gap from its two associated adjacent secondary pole faces and a portion of the area of at least one of the said secondary pole faces is always disposed opposite said primary pole face. The transducer of the invention may be composed of one primary pole face and coil, and two secondary pole faces and coils, or any multiple thereof.

When the primary pole face is centrally located between its two associated secondary pole faces, so that equal areas of the secondary pole faces are disposed opposite the primary pole face, the voltages, developed in the two secondary coils are equal and 180 degrees out of phase, resulting in a zero current flow or a null condition in the secondary. When, for example, the secondary core elements and coils move in one direction with respect to the primary so as to change the respective areas of the two secondary pole faces opposite their related primary pole face, the voltage and current generated in one of the two associated secondary coils will increase because of increasing flux in the core of such secondary coil, and the voltage and current induced in the other coil of the secondary will decrease because of the reduction in flux through its core. However, if the direction of the motion of the secondary is reversed, the development of induced voltage and current is the same as noted above for a given displacement, except that the polarity thereof is 180 degrees out of phase with the voltage and current induced in the aforementioned instance. During this period of movement the gap between the primary and secondary pole faces is preferably maintained substantially constant, as pointed out hereinafter.

The transducer of the invention is based on a relayed flux principle, that is, the magnetic flux is gated by changing the area between the pole face surfaces of the primary and secondary in a manner which substantially does not change the spacing between such pole face surfaces. This permits obtaining relatively large displacements between the primary and secondary, with a substantially linear relationship between flux in the pole faces and the displacement. The invention transducer is particuarly advantageous in instruments which require different amounts of displacement in going from minimum to maximum output.

These and other advantages and objects of my invention will be understood by reference to the accompanying drawings, wherein—

Fig. 3 is an exploded isometric view, partially schematic, of one end of the device shown in Fig. 2;

Fig. 4 is a section taken on line 4—4 of Fig. 2, looking in the direction of the arrows; and Fig. 5 is a section through one form of core element, winding and pole face employed in the invention transducer.

Figure 1:
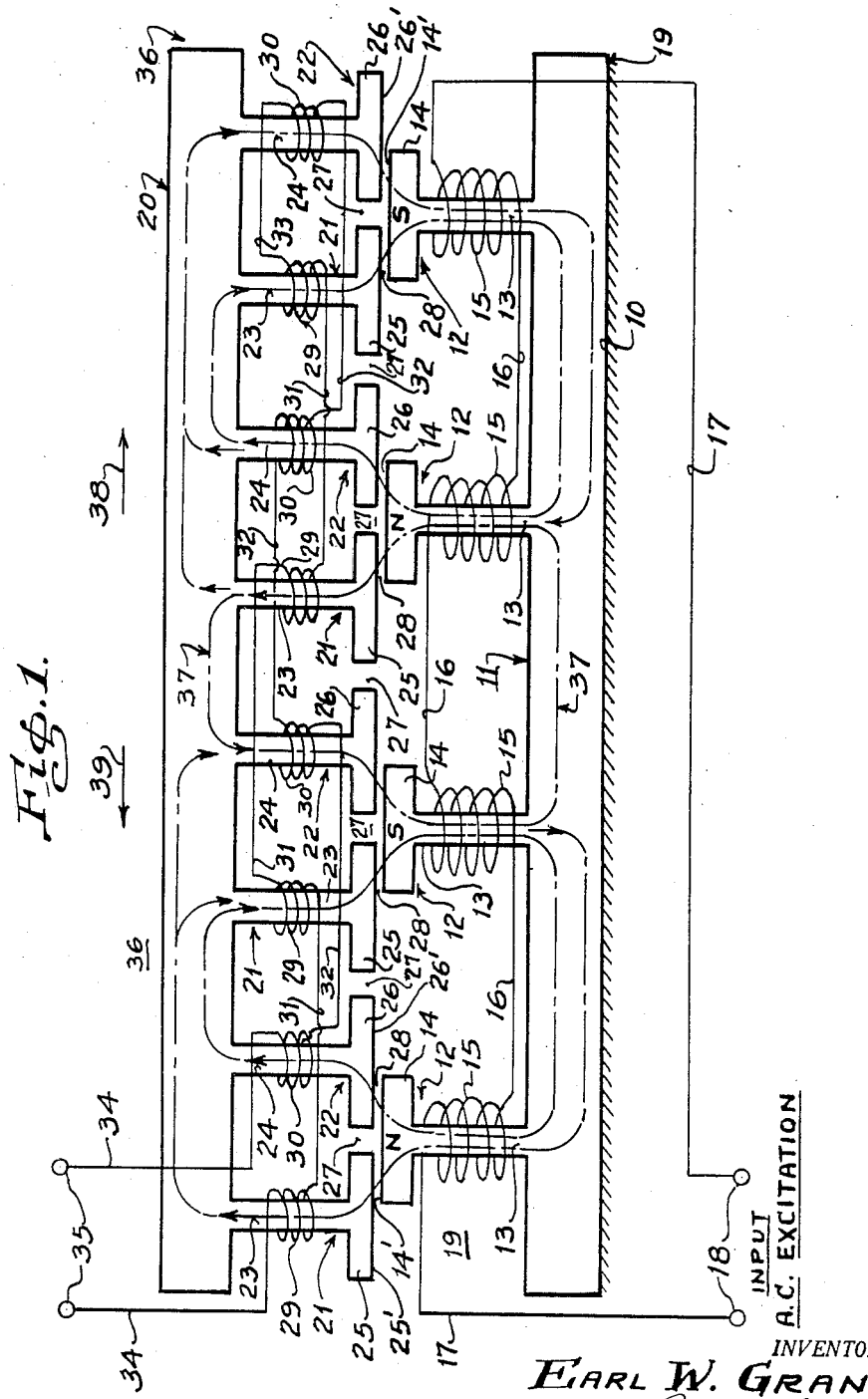
Fig. 1 shows in schematic form an elementary circuit and structure embodying the invention principles.

Referring to Fig. 1, numeral 10 represents a base or frame on which is mounted a longitudinally extending core member 11 having a plurality of core elements 12, shown as four in number, connected at substantially equally spaced intervals along member 10. Core elements 12 are T-shaped, each having a vertical portion 13 and a cross member 14 connected to the upper end of portion 13, the cross member 14 constituting a pole of each of the core elements 12. Each of the core elements 12 has a coil 15 wound about the vertical portion 13 of such elements, the adjacent ends of coils 15 being connected in series by wires 16. The two end coils are then connected by means of wires 17 to the input terminals 18 of an alternating current power source, placing the coils 15 in series circuit. The above core and coil structure constitutes the primary 19 of the transducer.

Mounted by suitable means (not shown) above core member 11 and the core elements 12 thereof, is a longitudinally extending core member 20 substantially coextensive in length with core member 11, the former having a series of core elements 21 and 22 suspended from member 20 and equally spaced therealong. There are shown four pairs of core elements 21 and 22, each such pair being operatively associated with one of the core elements 12, as pointed out more fully below. Core elements 21 and 22 are T-shaped and are of substantially the same size and configuration. Each of core elements 21 and 22 has a vertical portion 23 and 24, and a cross member 25 and 26, respectively. Portions 23 and 24 of core elements 21 and 22 are equally spaced longitudinally from the opposite vertical portion 13 of the associated primary core element 12.

The poles or cross members 25 and 26 of adjacent core elements 21 and 22 opposite each core element 12, are separated by an air gap 27, and the respective faces 25' and 26' of poles 25 and 26 are equally spaced from the adjacent face 14' of poles 14 by an air gap 28. The adjacent pole faces 25' and 26' of core elements 21 and 22 have equal areas disposed above the adjacent or opposite pole face 14' of a core element 12, with the air gap 27 centrally located above each such pole face 14'.

Each of core elements 21 and 22 has a coil 29 and 30, respectively, wound about the vertical portions 23 and 24 of such elements. The adjacent ends of coils 29 are connected in series by wires 31, and the adjacent ends of coils 30 are connected in series by wires 32. The two groups of coils 29 and 30 are connected by a cross wire 33. The adjacent end coils 29 and 30 are connected by wires 34 to output terminals 35, placing the two groups of coils 29 and 30 in series circuit. This core and coil structure constitutes the secondary 36 of the transducer. The secondary 36 is suitably mounted for movement in a longitudinal direction with respect to the primary 19, in response to a longitudinal force applied to the secondary.

The core 11 and core elements 12 of the primary, and the core 20 and core elements 21 and 22 of the secondary are constructed of a material, for example, steel, having high magnetic permeability.

It is seen that coils 15 of the primary are wound in such a manner as to make adjacent pole faces 14' of the primary of opposite magnetic polarity, that is, such adjacent pole faces are north and south poles, when the coils 15 are energized, e.g., from a source of alternating current applied to the terminals 18. The flux paths set up when the coils are energized by the excitation current are shown in phantom lines 37 with both the secondary pole pieces 25' and 26 of opposite polarity to the opposite primary core element 12, as seen in Fig. 1. When the secondary coil elements 21 and 22, and the secondary or pick-up coils 29 and 30 are in the position shown in Figure 1 with respect to the primary core elements 12 and cores 15, it will be seen that there are equal amounts of flux flowing through coils 21 and 22.

When the secondary 36 and the pick-up coils thereon are displaced to the right as indicated by the arrow 38 in Fig. 1, it will be seen that a greater area of the secondary pole faces 25' will be disposed opposite the adjacent primary pole faces 14', and a correspondingly smaller area of the secondary pole faces 26' will be disposed opposite the adjacent primary pole faces 14'. Thus, the flux in core elements 22 and the coils 30 thereon will decrease while the flux in core elements 21 and the coils 29 thereon will increase. This gives a resulting voltage output at terminals 35 proportional to the difference between these areas and to the difference in these two fluxes.

If, however, the secondary 36 and the pick-up coils 29 and 30 thereon are urged to the left as indicated by the arrow 39, a greater area of the secondary pole faces 26' will be located opposite the adjacent primary pole faces 14', and a correspondingly smaller area of the secondary pole faces 25' will be positioned opposite primary pole faces 14'. In this case, the flux in coils 30 will increase while the flux in coils 29 will decrease, resulting in a voltage output proportional to the difference between these areas and between the fluxes, but of opposite sign from that when the secondary is displaced to the right as previously described. In other words, the voltage output at terminals 35 is of equal amount when the secondary is displaced an equal distance to the right or left from its position shown in Fig. 1, but the two voltages will be 180 degrees out of phase with each other. Hence, the voltage output is proportional to the amount of displacement of the secondary with respect to the primary, and the direction of movement is indicated by the polarity of the voltage output. The size of the gap 28 between each of the secondary pole faces 25' and 26', and the adjacent cooperating primary pole face 14', remains substantially constant during longitudinal movement of the secondary 36 with respect to the primary 19.

Figure 2:
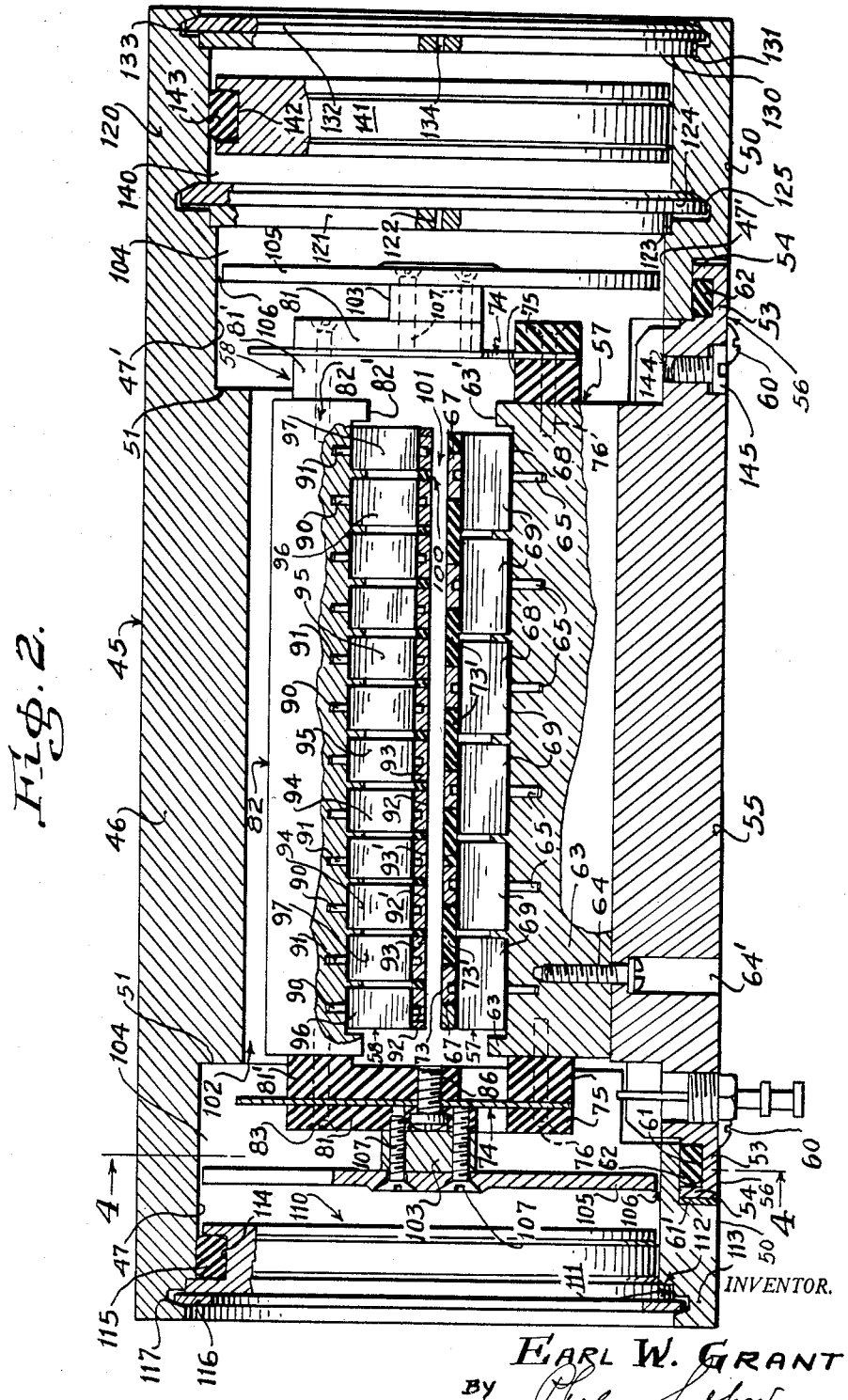
Fig. 2 is a vertical longitudinal section of a transducer according to the invention.

Referring now to Figs. 2 to 4 showing a transducer device incorporated in a linear accelerometer and employing the invention principles, numeral 45 represents a housing or case of an oblong shape having a solid inner central wall section 46, and generally cylindrical inner end wall sections 47 and 47' adjacent opposite ends of the center wall section 46. The case is open at opposite ends as indicated at 48 in Fig. 3, and has a rectangular opening 49 in the base 50 thereof to receive the primary and secondary structure and mounting therefor, as will be pointed out more fully below. The rectangular opening 49 extends for a distance beyond the end walls 51 of the center wall section 46, and communicates with an inner central recess 52 cut into the central wall section 46, said recess having a width substantially equal to the width of opening 49, a length coextensive with the length of central wall section 46, and a height or depth extending from opening 49 more than half way upwardly through the wall section 46.

Mounted on an oblong block 55 having outwardly extending end members 56 is the primary 57 and secondary 58 of the transducer hereof. The oblong block 55 is of a size such that the bottom portion thereof fits snugly into the rectangular opening 49, with the upper portion 59 thereof extending part way into recess 52, the length of such upper portion being substantially coextensive with the length of recess 52 between the end walls 51 of the center wall section 46. Disposed about the entire lower periphery of block 55 is a lip 53 having a vertical end member 54 connected thereto, and forming a recess 61 about block 55 in which is positioned an O-ring 62 to prevent leakage of fluid from within the instrument. Members 53, 54 and 62 fit into a recess 61' in the housing 45, said recess surrounding the rectangular opening 49 in the base 50. The block 55 is connected to the bottom 50 of the housing 45 by means of screws 60.

The primary includes an elongated core 63 attached to the upper surface of block 55 by means of set screws 64 disposed in recesses 64' of the block. At spaced intervals along the upper surface 63' of core 63 are positioned a series of vertical core elements 65. As seen in Fig. 5, the lower portions of said core elements are embedded in the core 63, and are formed of a plurality of laminated sheets 66 which are received at their upper ends in a recess 67' in flat plate or pole piece 67. About each of the core elements 65 is positioned a spool 68 constructed of an insulator material, and on each of the spools is wound a coil 69 of conductor wire. The coils 69 are connected together in series as described above in connection with the primary coils 15 of Fig. 1, and the end connections 70 (see Fig. 3) are attached to input terminals 71 connected to the end portions 56 of block 55. It is noted that the upper surfaces 73 of pole pieces 67 are coplanar, and that coils 69 and such pole pieces are spaced from each other. Disposed between the pole faces 67 is insulation material 73', e.g., a phenolic resin, the upper surface of the material being at a level with the surfaces 73 of pole faces 67. Core 63, core elements 65 and pole pieces 67 are constructed of a material of high magnetic permeability, while block 55 is constructed of a material substantially devoid of magnetic properties.

A pair of cantilever springs 74 are provided, each being in the form of a planar coil, consisting of a series of straight portions 74', 75', 76', 77', 78' and a T-portion 79, each bent at right angles to its adjacent portions. Each of springs 74 is supported at its lower ends in vertical position between a pair of blocks 75 attached to opposite ends of core 63 by means of screws 76 passing through apertures 77 in said blocks and apertures 78 in the lower portion 74' of said springs. The central T-portion 79 of spring 74 are each mounted between a pair of T-blocks 80 and 80', the upper cross members 81 and 81' of which are connected to the opposite ends of a second elongated secondary core 82 by means of screws 83 passing through apertures 84 in said T-blocks 80 and 80', and apertures as 85 in T-portion 79 of spring 74. Another screw 86 passes through an aperture 87 in the lower end of block 80 and 80', and an aperture 88 in the lower end of the T-portion 79 of each of springs 74, to preparly secure the springs to the T-blocks 80 and 80'.

The core 82 of the secondary 58 of the transducer is accordingly suspended above the primary 57 on the cantilever springs 74. Core 82 is approximately coextensive in length with the primary core 63. Positioned at spaced intervals along the lower surface 82' of core 82 is a series of alternate vertical core elements 90 and 91, the upper portions of said core elements being disposed in the core 82 in a manner similar to core elements 65 in the core 63. There are twice the total number of secondary core elements 90 and 91, as primary core elements 65. Core elements 90 and 91 are constructed similarly to the core elements 65, as seen in Fig. 5, each of said elements 90 and 91 having a flat plate or pole piece 92 and 93, respectively, connected to the lower ends thereof. The core elements 90 and 91 are encircled by insulating spools 94 and 95, respectively, and about each of spools 94 and 95 is wound a coil of conductor wire 96 and 97, respectively. The coils 96 are connected together in series and the coils 97 are connected in series, and both groups of coils 96 and 97 are in turn series connected to form a single series circuit, as described above with respect to the secondary coils 29 and 30 of Fig. 1, and the end connections (not shown) are attached to output terminals 98 connected to the end portions 56 of block 55, adjacent the input terminals 71.

It is noted that core elements 90 and 91 are equally displaced longitudinally from the opposite primary core elements 65. The pole pieces 92 and 93 are separated from each other and such spaces are filled with an insulation material 100, the lower surfaces of which are at a level with the lower surfaces 92' and 93' of pole pieces 92 and 93. The lower surfaces 92' and 93' of pole pieces 92 and 93 are coplanar, and such surfaces are equally spaced from the upper coplanar surfaces 73 of the primary pole pieces 67, forming a gap 101 therebetween. As viewed in Fig. 2, each of the adjacent pole faces 92' and 93' of core elements 90 and 91 has an equal area disposed above the adjacent cooperating pole face 73 of core elements 65, with the insulator 100 centrally positioned above each pole face 73.

Secondary core 82, core elements 90 and 91, and pole pieces 92 and 93 are constructed of a material of high magnetic permeability, while blocks 75, 81 and 81' are constructed of an insulating material. It is seen that block 55 with the primary structure 57 and the secondary structure 58 mounted thereon fits substantially within the recess 52 in the center wall section 46 of the instrument housing 45, only a relatively small space 102 being provided between the top of the secondary core 82 and the inner wall of the central wall section 46. This space provides sufficient clearance to enable the secondary core 82 and the core elements 90 and 91, and the coils 96 and 97 mounted thereon to move longitudinally with respect to the primary core 63 and the core elements 65 and the coils 69 thereon, as described more fully below. The secondary core 82 and all of the structure connected thereto in effect "floats" above the primary on the cantilever springs 74 connected to the primary core 63.

Centrally positioned on a hub 103 connected to each of T-block 81 at opposite ends of the device, and disposed in each of the cylindrical chambers 104 and 104' adjacent opposite ends of the central wall section 46 is a circular baffle 105 having a diameter slightly smaller than the cylindrical inner end wall sections 47 and 47', leaving only a small circular space or slot 106 between the periphery of the baffle and end wall sections 47 and 47', the baffles being secured to the hubs 103 which are in turn secured to T-blocks 81, by means of screws 107 passing into apertures 108 of such T-blocks. Baffles 105 and the annular spaces 106 formed thereby function as a cushioning device or dash pot with respect to movement or displacement of the secondary 58 on springs 74 in relation to the primary 57. The baffles 105 force the liquid or oil contained within the instrument to increase in velocity as it passes through the annular slot 106, thereby lowering the effective natural frequency of the secondary 58. Hence, in effect the baffles 105 cause the mass of liquid to function as part of the mass of the secondary.

One end of the device is sealed by a cover 110 having an outwardly extending flange 111 abutting the shoulder 112 formed between the outer end of end wall section 47 and a flange 113 connected thereto. The cover 110 has a peripheral groove 114, in which is disposed an O-ring seal 115, and the cover is secured in position by a snap ring 116 disposed in a groove 117 in the inner surface of flange 113.

In the outer wall section 120 at the opposite end of the housing 45, and spaced from the adjacent baffle 105 is positioned a partition 121 having a central aperture 122 therein to permit passage of liquid to opposite sides of the partition. The partition 121 has a diameter slightly smaller than the internal diameter of outer wall section 120, and the outer peripheral portion of member 121 abuts a shoulder 123 at the outer end of bore 47', the diameter of which is smaller than that of partition 121. Member 121 is held in place by a snap ring 124 in an adjacent recess 125. At the outer end of wall section 120 is positioned a cover 130, the outer periphery of which is disposed in a recess 131 in wall section 120, the cover 130 being held in place by a snap ring 132 disposed in an adjacent recess 133 of wall section 120. Cover 130 has a central breather hole 134 therein.

Disposed in chamber 140 between partition 121 and cover 130 is a snugly fitting slidable piston 141 having a recess 142 in its outer periphery into which is disposed an O-ring seal 143 to prevent passage of liquid from one side of the piston to the other. The function of piston 141 is to permit for volume changes of the liquid inside the instrument due to temperature changes, the piston, for example, sliding outwardly on expansion of the liquid due to temperature increase. A filler hole 144 stoppered by a screw 145 is provided for introducing liquid into the instrument. Such liquid fills the interior of the instrument from cover 110 at the left in Fig. 2 to the piston 141 at the right.

To assemble the device of Figs. 2 to 4, block 55 having primary core 63, the core elements 65, the coils 69 and gasket 62 assembled thereon is passed through the rectangular aperture 49 in the base 50 of the open ended instrument housing 45, and is attached to the housing by means of screws 60. The secondary core 82 with the core elements 90 and 91 and the coils 96 and 97 properly assembled thereon, is then introduced through an open end of the instrument into the recess 52 above the primary assembly 57. The secondary assembly 58 is held suspended above the primary assembly by suitable means while the blocks 75, 81 and 81', and cantilever springs 74 are connected to opposite ends of primary core 63 and secondary core 82. The secondary assembly 58 is now properly mounted above the primary 57 for longitudinal movement relative thereto. Prior to insertion of the primary and secondary assemblies 57 and 58 into housing 45, the coils mounted on the respective assemblies are connected in series as previously described. Following assembly of the primary and secondary in the housing 45, the primary series circuit connections 70 are connected to input terminals 71, and the secondary series circuit connections (not shown) are connected to the output terminals 98.

Next, hubs 103 mounting baffles 105 are connected by means of screws 107 to the block and cantilever assemblies at opposite ends of the primary and secondary assemblies. The cover 110 is then mounted in position by inserting snap ring 116 into its recess 117, and partition 121 is placed in position by inserting snap ring 124 into recess 125. The piston 141 is then inserted in the desired position within chamber 140, following which cover 130 is mounted in position by inserting snap ring 132 in recess 133. The instrument is then filled with liquid through fill hole 144, and the stopper 145 is then screwed into place in the hole.

The instrument of Fig. 2 can be mounted in a vehicle by suitable means, for determining or controlling the linear acceleration of the vehicle, and input terminals 71 are connected to a source of A.C. electrical energy. On acceleration of the vehicle and instrument housing 45 to the left as viewed in Fig. 2, the upper portion of cantilever springs 74 on which the secondary assembly 58 is mounted will be deflected to the right, causing longitudinal movement of secondary core 82 and the core elements and coils thereof to the right with respect to primary core 63 and the core elements and coils mounted thereon. As a result, a greater area of each secondary pole face 92' will be positioned over the adjacent primary pole face 73, and a correspondingly smaller area of each secondary pole face 93' will be located over the adjacent primary pole face 73 of pole pieces 67. Thus, the flux in coils 97 will decrease while the flux in coils 96 increases, producing a voltage output at terminals 98 which is proportional to the amount of movement of the secondary core 82 with respect to the primary 63, and hence to the magnitude of the acceleration to which the instrument is subjected.

If the acceleration of the vehicle and instrument is to the right as viewed in Fig. 2, the upper portion of cantilever springs 74 will deflect to the left to cause longitudinal movement of secondary core 82 and the core elements and coils thereof in the same direction while the primary core 63 and its core elements and coils remain stationary. This results in placing a greater area of each secondary pole face 93' over the adjacent primary pole face 73, and a correspondingly smaller area of each secondary pole face 92' over the adjacent primary pole face 73. Consequently, the flux in secondary coils 97 will increase while the flux in coils 96 decreases. This also produces a voltage output at terminals 98 which is proportional to the extent of longitudinal movement of secondary core 82 and to the magnitude of the acceleration. However, the voltage output here will be 180 degrees out of phase with the previously mentioned voltage output, indicating the acceleration is in the opposite direction from that previously described.

The maximum distance which the secondary 58 moves to the right or left with respect to the primary 57 is about half the distance across each secondary pole face 92' or 93'. When the secondary is displaced its maximum distance to the right or left, the output at terminals 98 will be a maximum, since the greatest area differential will exist between the areas of the secondary pole faces 92' and 93' disposed above the primary pole face 73. If the secondary 58 is permitted to move sufficiently to the left or right so that the entire area of secondary pole faces 92' or 93' is located opposite the adjacent primary pole faces 73 while no portion of the other secondary pole face is disposed above the primary pole face, maximum output will be obtained under these conditions. In the normal zero or rest position of the primary 57 and secondary 58, as seen in Fig. 2, equal areas of each of the secondary pole faces 92' and 93' are disposed above the adjacent primary pole faces 73, resulting in a minimum or zero output at terminals 98.

During the movement of secondary core 82 with respect to the primary core 63, the plane of the secondary pole faces 92' and 93' remains substantially parallel to the plane of the primary pole faces 73, but the gap 101 between the primary and secondary pole faces may vary to a small degree. However, this variation in the size of the gap 101 is within the permissible error of the instrument, that is, the instrument is essentially insensitive to these small variations in the gap 101. The use of the cantilever springs 74 aids in making the variations in gaps 101 relatively minor and insignificant. Thus, for all practical purposes, it can be said that the size of this gap remains "substantially constant" during movement of the secondary 58 with respect to the primary 57, and hence the above quoted expression as employed herein and in the claims, and as applied to the size of the gap between the secondary and primary pole faces is intended to cover the above described small variations in said gap.

By varying the sizes of the pole faces, it is possible to obtain full output with different amounts of displacement. Thus, if a larger displacement is required in going from minimum to maximum output, the pole faces are made wider and the spacing between the primary and secondary pole faces, i.e., space 101, is increased. This increase in spacing is necessary in order to maintain the same value of magnetic reluctance in the air gap between such pole faces when the pole faces are in the maximum output position.

The input impedance and the output impedance are both readily controllable by changing the wire size of the coils and the number of turns therein. Further, control of the impedance is possible by connecting the coils in different parallel and series combinations. The iron or other core material through each coil is held to the minimum amount required to conduct sufficient flux for satisfactory operation. This amount is generally determined by the amount of copper loss and subsequent temperature rise that is to be allowed.

It will be understood that, if desired, the primary may be mounted for movement relative to the secondary, which may be held stationary, or both the primary and secondary may be mounted for movement relative to each other. Also, instead of employing cantilever springs 74 the motion of the secondary assembly 58 can be controlled by diaphragms or other similar devices. Further, instead of mounting the secondary on the primary for movement of the former relative to the latter, I can mount the secondary on the wall of the instrument housing for movement relative to the primary.

In place of having an equal area of the two secondary pole faces 92' and 93' opposite the adjacent primary pole face 73 when the instrument is in zero position, so that there is no output under these conditions, the zero or starting position may be changed so that say a greater area of one secondary pole face say, 92', is opposite the adjacent primary pole face 73, as compared to the area of its associated secondary pole face 93' opposite such pole face 73. In this case, there will be an output generated at the starting position, which output will increase or decrease as the secondary 58 is caused to move relative to the primary 57.

While we have described a particular embodiment of our invention for the purpose of illustration, it should be understood that various modifications and adaptations thereof may be made within the spirit of the invention as set forth in the appended claims.

I claim:

1. A transducer comprising a transformer including a pair of spaced first and second magnetically permeable cores, said first core including a first core element and said second core including a pair of spaced core elements, a first conductor coil about said first core, a pair of second conductor coils, one of said second coils being disposed about one of said core elements of said pair and the other of said second coils being disposed about the other of said core elements of said pair, said second coils being electrically connected, a first pole face on said first core element, a second pole face on each of said pair of core elements, the said second pole faces being of like polarity and of polarity opposite to the polarity of the first pole face, said second pole faces being spaced from each other, and each of said second pole faces being disposed opposite said first pole face and being separated therefrom by a gap, and means for moving one of said cores in a direction relative to the other of said cores to increase the area of one of said second pole faces disposed opposite said first pole face and to decrease the area of the other of said second pole faces disposed opposite said first pole face, while maintaining the size of said gap substantially constant, said first pole face being at all times disposed opposite at least a portion of the area of each of said second pole faces.

2. A transducer comprising a transformer including a magnetically permeable primary core, a magnetically permeable secondary core having a pair of spaced core elements, a primary conductor mounted on said primary core, a pair of core elements mounted on said secondary core, a pair of secondary conductor coils, one of said coils of said pair being inductively coupled with one of said secondary core elements and the other of said coils being inductively coupled with the other of said pair of secondary core elements, a first flat pole face on said primary core, a second flat pole face on each of said secondary core elements of said pair of secondary core elements, said second pole faces being spaced from each other, and each of said second pole faces being disposed opposite said first pole face and being separated therefrom by a gap, said pole faces of said pair of secondary core elements being of like polarity and of opposite polarity to the polarity of said pole face of said primary core, and means for moving one of said cores in a linear direction relative to the other of said cores to increase the area of one of said second pole faces disposed opposite said first pole face and to decrease the area of the other of said second pole faces disposed opposite said first pole face, while maintaining the size of said gap substantially constant, said first pole face being at all times disposed opposite a portion of the area of said second pole faces.

3. A transducer as defined in claim 2, wherein said primary core is fixed to said transducer and said secondary core is resiliently mounted for linear movement relative to said primary core.

4. A transducer comprising a transformer including a pair of spaced first and second cores, a plurality of spaced first core elements on said first core, a plurality of spaced pairs of second and third core elements on said second core, a first conductor coil wound about each of said first core elements, a second and third conductor coil wound about each of said respective second and third core elements, a first pole face on each of said first core elements, a second and third pole face on each core element of the respective pairs of second and third core elements, said first pole faces being spaced from each other and said second and third pole faces being spaced from each other, said first pole faces being separated from the adjacent second and third pole faces by a gap, said first coils being connected in a first circuit to impart opposite polarity to the adjacent first pole faces when a source of electrical energy is connected in said circuit, said second and third coils being connected in a second circuit, each of the adjacent second and third pole faces having at least a portion of their surface areas disposed opposite the adjacent first pole face, to permit the establishment of flux paths from said first core elements across said gap and through said second and third core elements when a voltage is applied in said first circuit, and means for moving one of said first cores in a direction relative to the other of said cores to increase the area of the second pole faces disposed opposite the adjacent first pole faces and to decrease the area of the third pole faces disposed opposite said adjacent first pole faces, while maintaining the size of said gap substantially constant.

5. A transducer as defined in claim 3, wherein one of said cores is fixed to the transducer and the other of said cores is resiliently mounted on said fixed core for movement relative thereto.

6. A transducer comprising a housing and a transformer mounted therein and including a first primary core, a second secondary core spaced from said first core, a plurality of spaced first core elements on said first core, a plurality of spaced pairs of second and third core elements on said second core, a first conductor coil wound about each of said first core elements, a second and third conductor coil wound about each of said respective second and third core elements, a first pole face on each of said first core elements, located adjacent one end of said first coils, a second and third pole face on each core element of the respective pairs of second and third core elements, said second and third pole faces being located at adjacent ends of said second and third coils respectively, said first pole faces being substantially coplanar and spaced from each other, and said second and third pole faces being substantially coplanar and spaced from each other, said first pole faces being separated from the adjacent second and third pole faces by a gap, said first coils being connected in a first series circuit to impart opposite polarity to the adjacent first pole faces when a source of electrical energy is connected in said circuit, said second and third coils being connected in a second circuit, each of the adjacent second and third pole faces having at least a portion of their surface areas disposed opposite the adjacent first pole face, to permit the establishment of flux paths from said first core elements across said gap and through said second and third core elements when a voltage is applied in said first circuit, and means for moving one of said cores in a direction relative to the other of said cores to increase the area of the second pole faces disposed opposite the adjacent first pole faces and to decrease the area of the third pole faces disposed opposite said adjacent first pole faces, while maintaining the size of said gap substantially constant.

7. A transducer as defined in claim 6, wherein said primary core is connected to said housing and said secondary core is mounted for movement relative to said primary core, said moving means including a cantilever spring mounted on said primary core and connected to said secondary core.

8. A transducer comprising a housing and a transformer mounted therein and including a first elongated primary core, a second elongated secondary core spaced transversely from said first core, a plurality of spaced first core elements positioned longitudinally along said first core, a plurality of spaced pairs of second and third core elements positioned longitudinally along said second core, a first conductor coil wound about each of said first core elements, a second and third conductor coil wound about each of said respective second and third core elements, a first pole face on each of said first core elements, located adjacent one end of said first coils, a second and third pole face on each core element of the respective pairs of second and third core elements, said second and third pole faces being located at adjacent ends of said second and third coils respectively, said first pole faces being substantially coplanar and spaced from each other, and said second and third pole faces being substantially coplanar and spaced from each other, the respective planes of said pole faces being essentially parallel, said first pole faces being separated from the adjacent second and third pole faces by a gap, said first coils being connected in a first circuit to impart opposite polarity to the adjacent first pole faces when a source of electrical energy is connected in said circuit, said second and third coils being connected in a second circuit, each of the adjacent second and third pole faces having at least a portion of their surface areas disposed opposite the adjacent first pole face, to permit the establishment of flux paths from said first core elements across said gap and through said second and third core elements when a voltage is applied in said first circuit, and means for moving one of said elongated cores in a longitudinal direction relative to the other of said cores to increase the area of the second pole faces disposed opposite the adjacent first pole faces and to decrease the area of the third pole faces disposed opposite said adjacent first pole faces, while maintaining the size of said gap substantially constant.

9. A transducer comprising a housing and a transformer mounted therein and including a pair of spaced first and second cores, a plurality of spaced first core elements on said first core, a plurality of spaced pairs of successive second and third core elements on said second core, a first conductor coil wound about each of said first core elements, a second and third conductor coil wound about each of said respective second and third core elements, a first pole face on each of said first core elements, located adjacent one end of said first coils, a second and third pole face on each core element of the respective pairs of second and third core elements, said second and third pole faces being located at adjacent ends of said second and third coils respectively, said first pole faces being substantially coplanar and spaced from each other, and said second and third pole faces being substantially coplanar and spaced from each other, said first pole faces being separated from the adjacent second and third pole faces by a gap, said first coils being connected in a first series circuit to impart opposite polarity to the adjacent first pole faces when a source of electrical energy is connected in said circuit, input terminals for said circuit on said housing, said second coils being connected as a group in series, said third coils being connected as a group in series, said groups being connected to form a second series circuit, output terminals for said second circuit on said housing, each of the adjacent second and third pole faces having at least a portion of their surface areas disposed opposite the adjacent first pole face, to permit the establishment of flux paths from said first core elements across said gap and through said second and third core elements when a voltage is applied in said first circuit, and means for moving one of said cores in a direction relative to the other of said cores to increase the area of the second pole faces disposed opposite the adjacent first pole faces and to decrease the area of the third pole faces disposed opposite said adjacent first pole faces, while maintaining the size of said gap substantially constant.

10. A transducer comprising a housing and a transformer mounted therein and including a pair of spaced first and second cores, said cores extending longitudinally and substantially coextensive with each other, a plurality of transverse spaced first core elements positioned longitudinally on said first core, a plurality of transverse spaced pairs of second and third core elements positioned longitudinally on said second core, a first conductor coil wound about each of said first core elements, a second and third conductor coil wound about each of said respective second and third core elements, a first substantially flat pole face at the outer end of each of said first core elements and located adjacent one end of said first coils, a second and third substantially flat pole face at the outer end of each core element of the respective pairs of second and third core elements, said second and third pole faces being located at adjacent ends of said second and third coils respectively, said first pole faces being substantially coplanar and spaced from each other, and said second and third pole faces being substantially coplanar and spaced from each other, the respective planes of said pole faces being essentially parallel, said first pole faces being separated from the adjacent second and third pole faces by a gap, said first coils being connected in a first circuit to impart opposite polarity to the adjacent first pole faces when a source of electrical energy is connected in said circuit, said second and third coils being connected in a second circuit, each of the adjacent second and third pole faces having at least a portion of their surface areas disposed opposite the adjacent first pole face, to permit the establishment of flux paths from said first core elements across said gap and through said second and third core elements when a voltage is applied in said first circuit, and resilient means for moving one of said cores in a longitudinal direction relative to the other of said cores to increase the area of the second pole faces disposed opposite the adjacent first pole faces and to decrease the area of the third pole faces disposed opposite said adjacent first pole faces, while maintaining the size of said gap substantially constant.

11. A transducer comprising a housing and a transformer mounted therein and including a first elongated primary core, a second elongated secondary core spaced transversely from said first core, said cores being substantially coextensive, a plurality of transverse spaced first core elements positioned longitudinally along said first core, a plurality of transverse spaced pairs of second and third core elements positioned longitudinally along said second core, a first conductor coil wound about each of said first core elements, a second and third conductor coil wound about each of said respective second and third core elements, a first substantially flat pole face at the outer end of each of said first core elements, and located adjacent one end of said first coils, a second and third substantially flat pole face at the outer end of each core element of the respective pairs of second and third core elements, said second and third pole faces being located at adjacent ends of said second and third coils respectively, said first pole faces being substantially coplanar and spaced from each other, and said second and third pole faces being substantially coplanar and spaced from each other, the plane of said pole faces being essentially parallel, each of said first pole faces being disposed opposite and separated from the adjacent second and third pole faces by a gap, said first coils being connected in a first series circuit to impart opposite polarity to the adjacent first pole faces when a source of electrical energy is connected in said circuit, input terminals for said circuit on said housing, the adjacent ends of said second coils being connected as a group in series, the adjacent ends of said third coils being connected as a group in series, said groups being connected to form a second series circuit, output terminals for said second circuit on said housing, each of the adjacent second and third pole faces having at least a portion of their surface areas disposed opposite the adjacent first pole face, to permit establishment of flux paths from said first core elements across said gap and through said second and third core elements when a voltage is applied in said first circuit, said primary core being connected to said housing, a resilient member mounted on said primary core and connected to said secondary core for moving said secondary core in a longitudinal direction relative to said primary core to increase the area of the second pole faces disposed opposite the adjacent first pole faces and to decrease the area of the third pole faces disposed opposite said adjacent first pole faces while maintaining the size of said gap substantially constant.

References Cited in the file of this patent

UNITED STATES PATENTS

| | | |
|---|---|---|
| 2,470,244 | Fryklund | May 17, 1949 |
| 2,545,881 | Graham | Mar. 20, 1951 |
| 2,609,531 | Kirchner | Sept. 2, 1952 |
| 2,744,335 | Litman | May 8, 1956 |